United States Patent
Ohazama et al.

(10) Patent No.: US 8,381,129 B2
(45) Date of Patent: *Feb. 19, 2013

(54) USER INTERFACE FOR SELECTING OPTIONS

(75) Inventors: Chikai J. Ohazama, Mountain View, CA (US); Darren Delaye, San Francisco, CA (US)

(73) Assignee: Google Inc., Mountain View, CA (US)

( * ) Notice: Subject to any disclaimer, the term of this patent is extended or adjusted under 35 U.S.C. 154(b) by 360 days.

This patent is subject to a terminal disclaimer.

(21) Appl. No.: 12/610,956

(22) Filed: Nov. 2, 2009

(65) Prior Publication Data

US 2010/0050120 A1 Feb. 25, 2010

Related U.S. Application Data

(63) Continuation of application No. 11/353,316, filed on Feb. 13, 2006, now Pat. No. 7,614,018.

(51) Int. Cl.
*G06F 3/048* (2006.01)
(52) U.S. Cl. .......... 715/815; 715/862; 715/763
(58) Field of Classification Search .......... 715/815, 715/862, 763
See application file for complete search history.

(56) References Cited

U.S. PATENT DOCUMENTS

| | | | | |
|---|---|---|---|---|
| 5,736,974 A * | 4/1998 | Selker | ............................ | 715/862 |
| 5,737,455 A * | 4/1998 | Harrington et al. | ............ | 382/284 |
| 5,973,694 A * | 10/1999 | Steele et al. | ................... | 715/835 |
| 6,061,659 A * | 5/2000 | Murray | ....................... | 705/14.73 |
| 6,348,923 B2 * | 2/2002 | Murata | .......................... | 345/629 |
| 6,477,268 B1 * | 11/2002 | Chiang et al. | .................. | 382/154 |
| 6,597,380 B1 * | 7/2003 | Wang et al. | ................... | 715/782 |
| 6,734,877 B1 * | 5/2004 | Honda et al. | ................... | 715/721 |
| 6,816,551 B1 * | 11/2004 | Kasutani | ................... | 375/240.08 |
| 7,434,177 B1 * | 10/2008 | Ording et al. | ................... | 715/862 |
| 7,614,018 B1 | 11/2009 | Ohazama et al. | | |
| 7,627,189 B2 * | 12/2009 | Donomae et al. | ............. | 382/254 |
| 7,646,395 B2 * | 1/2010 | Chatting et al. | .............. | 345/646 |
| 7,791,651 B2 * | 9/2010 | Donomae et al. | ............. | 348/234 |
| 2001/0029527 A1 * | 10/2001 | Goshen | ......................... | 709/218 |
| 2002/0160817 A1 * | 10/2002 | Salmimaa et al. | ............. | 455/566 |
| 2007/0014483 A1 * | 1/2007 | Ohara et al. | ................... | 382/274 |

* cited by examiner

*Primary Examiner* — Phenuel Salomon
(74) *Attorney, Agent, or Firm* — Sterne, Kessler, Goldstein & Fox P.L.L.C.

(57) ABSTRACT

Icons can be combined to form toolbars such as those appearing on computer desktops and within application windows such as web browsers. Small icons are desired because desktop real estate is expensive. Small icons can be difficult to select or open because it can be hard to confirm which icon is indicated. An icon is indicated when the desktop cursor hovers over it. Altering the indicated icon provides good user feedback. Icons can be changed varying their size. Non-indicated icons can revert to a minimum size while an indicated one grows to a maximum size. Different images can be displayed for different sized icons, producing a more pleasing appearance. Alternatively, icons can be presented as display images produced by morphing two images together using morphing functions and icon weights. Morphing includes growing and shrinking as well as color changes, animating, and so forth.

21 Claims, 7 Drawing Sheets

Fig. 11

US 8,381,129 B2

USER INTERFACE FOR SELECTING OPTIONS

This application is a continuation of U.S. application Ser. No. 11/353,316, filed Feb. 13, 2006 (now allowed), which is herein incorporated by reference in its entirety.

BACKGROUND

1. Field of the Invention

Embodiments relate to the fields of desktop computing environments, windowing systems, graphical user interfaces, and web browsers.

2. Background Art

Desktop computing environments are generally centered around a display device and a windowing system. The display device, such as a liquid crystal display, presents information. The windowing system arranges the information. A typical arrangement is an assortment of desktop icons and windows. A user can select a desktop icon with a pointing device. For example, under Microsoft Windows XP, double clicking the left mouse button while the mouse pointer is over an icon opens that icon. Opening a desktop icon causes a user application to launch. The user application opens at least one window on the desktop and the user interacts with the user application via the window.

The user uses a pointing device, usually a computer mouse, to select items on the desktop and within applications. Moving the mouse causes a desktop cursor to move. The desktop cursor indicates an icon, such as a desktop icon, when it is over the icon. An indicated desktop icon can be selected with a mouse click or opened with a double mouse click. The Windows XP windowing system darkens a selected desktop icon but does nothing to indicate that the desktop cursor is over the icon. Apple OS X has a Dock feature consisting of a row of icons. Indicating an icon causes the icon to grow from its current size to a maximum size. An icon that is no longer indicated shrinks from its current size to a minimum size. Those practiced in the art of desktop computing are familiar with windowing systems, computer desktops, and icons. Those practiced in the art of desktop computing under Apple OS X are familiar with Apple Dock, and icons that grow and shrink.

After the introduction of the Apple Dock, jsdock, short for javascript dock, technology was developed. The Apple Dock is used exclusively on the Apple OS X desktop and takes advantage of low level Apple OS X capabilities. The jsdock technology also produces a growing/shrinking effect on icons. The jsdock technology however, is used with web browsers and is not tied to any one operating system. A Windows XP user using the Firefox web browser can enjoy the jsdock graphical effects.

Apple Dock, which is part of the desktop, is used to launch user applications under Apple OS X. The jsdock technology, however, is run within a web browser and can not cause user applications to launch. Each jsdock icon can be associated with a software module that executes within the web browser when the jsdock icon is opened. A single mouse click, multiple mouse click, or other user input can be used to open a jsdock icon.

The jsdock technology, while being significantly different from the Apple Dock, suffers from a number of shortcomings. One shortcoming is that jsdock uses inefficient algorithms for discovering that an icon is indicated or not indicated and for scaling icons. Another shortcoming is that jsdock displays each icon by scaling a single image to the appropriate size. Yet another shortcoming is that jsdock is limited to image scaling effects.

BRIEF SUMMARY OF THE INVENTION

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

Methods and systems for displaying a user interface are provided. According to an embodiment, displaying a display image for each of at least two icons wherein each icon is associated with a respective icon size, small image, large image and morphing function. The morphing function is a function that may produce the display image from the small image and large image. The method may also include, upon indication of an icon, morphing the indicated icon's display image using the indicated icon's morphing function to grow the indicated icon's display image up to the size of the indicated icon's associated large image. The method may further include morphing at least one collateral icon's display image using the morphing function to shrink the respective collateral icon's display image down to the size of the at least one collateral icon's associated small image.

According to another embodiment, a method may include displaying a display image of each of at least two icons wherein each icon is associated with a respective first image, final image and morphing function. The morphing function is a function that produces the display image from the first image, the final image and a weight that is a parameter used to produce the display image. The method may also include, for every indicated icon having a weight less than the maximum value, increasing the indicated icon's weight and morphing the indicated icon's display image using the indicated icon's morphing function. The method may further include, for every collateral icon having a weight exceeding the minimum value, reducing the respective collateral icon's weight and morphing the respective collateral icon's display image using the respective collateral icon's morphing function.

According to an embodiment, a system may include a display module configured to display a display image for each of at least two icons on the display wherein each icon is associated with a respective icon size, small image, large image and morphing function that produces the display image from the small image and large image. The system may also include a morphing module configured to, upon indication of an icon, morph the indicated icon's display image up to the size of the indicated icon's associated large image using the indicated icon's morphing function. The morphing module may also be configured to morph at least one collateral icon's display image down to the size of the respective collateral icon's associated small image using the respective collateral icon's morphing function. The morphing module may be further configured to update the display images for icons on the display.

According to another embodiment, a system may include a display module configured to display a display image of each of at least two icons on a display device wherein each icon is associated with a respective first image, final image and morphing function. The morphing function may be a function that produces the display image from the first image, the final image and a weight that is a parameter used to produce the display image. The system may also include a morphing module configured to, for every indicated icon having a weight less than the maximum value, increase the respective indicated icon's weight and morph the respective indicated icon's display image using the respective indicated icon's morphing function. The morphing module may also be configured to, for every collateral icon having a weight exceeding the minimum value, reduce the respective collateral icon's weight and morph the respective collateral icon's display image using the respective collateral icon's morphing function. The morphing module may be further configured to update the display images for icons on the display.

BRIEF DESCRIPTION OF THE DRAWINGS/FIGURES

The accompanying figures, in which like reference numerals refer to identical or functionally similar elements throughout the separate views and which are incorporated in and form a part of the specification, further illustrate the embodiments and, together with the background, brief summary, and detailed description, serve to explain the principles of the embodiments.

DETAILED DESCRIPTION OF THE INVENTION

The particular values and configurations discussed in these non-limiting examples can be varied and are cited merely to illustrate embodiments and are not intended to limit the scope of the invention.

Overview

Icons can be combined to form toolbars such as those appearing on computer desktops and within application windows such as web browsers. Small icons are desired because desktop real estate is expensive. Small icons can be difficult to select or open because it can be hard to confirm which icon is indicated. An icon is indicated when the desktop cursor hovers over it. Altering the indicated icon provides good user feedback. Icons inside browser windows can be changed varying their size. Non-indicated icons can revert to a minimum size while an indicated one grows to a maximum size. Different images can be displayed for different sized icons, producing a more pleasing appearance. Alternatively, icons can be presented as display images produced by morphing two images together using morphing functions and icon weights. Morphing includes growing and shrinking as well as color changes, animating, and so forth.

Architectural Overview

Figure 1:
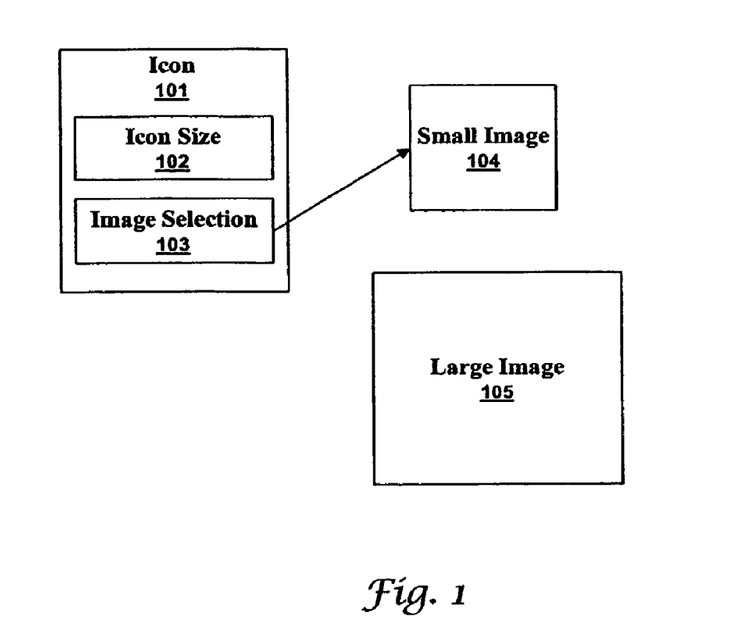
FIG. 1 illustrates an icon in accordance with aspects of certain embodiments.

FIG. 1 illustrates an icon 101 in accordance with aspects of certain embodiments. The icon has an icon size 102 and an image selection 103 for selecting a selected image. The image selection 103 is shown selecting a small image 104 associated with the icon 101. The image selection 103 can also select a large image 105 associated with the icon 101. The icon 101 can be displayed within a browser window as a scaled version of the selected image. Scaling means applying an algorithm to the selected image to produce an image having dimensions equaling a desired size.

Figure 2:
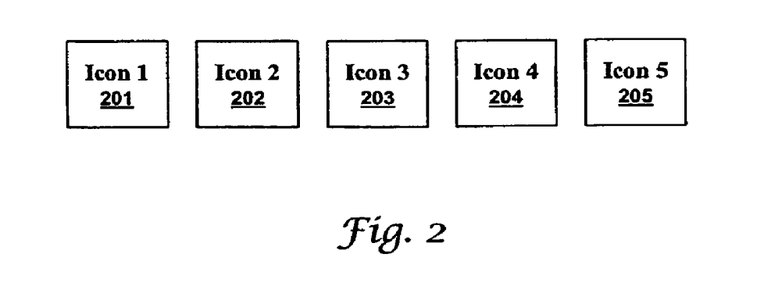
FIG. 2 illustrates a row of icons in accordance with aspects of the embodiments.

FIG. 2 illustrates a row of icons in accordance with aspects of the embodiments. As discussed above, a toolbar can be a simple display made of a row of icons. Icon 1 201, icon 2 202, icon 3 203, icon 4 204, and icon 5 205 are all shown as having the same icon size. All the icons have the same size because none of the icons is currently indicated or was recently indicated. The icon size of all the icons equals that of the small image corresponding to each of the icons, respectively.

Figure 3:
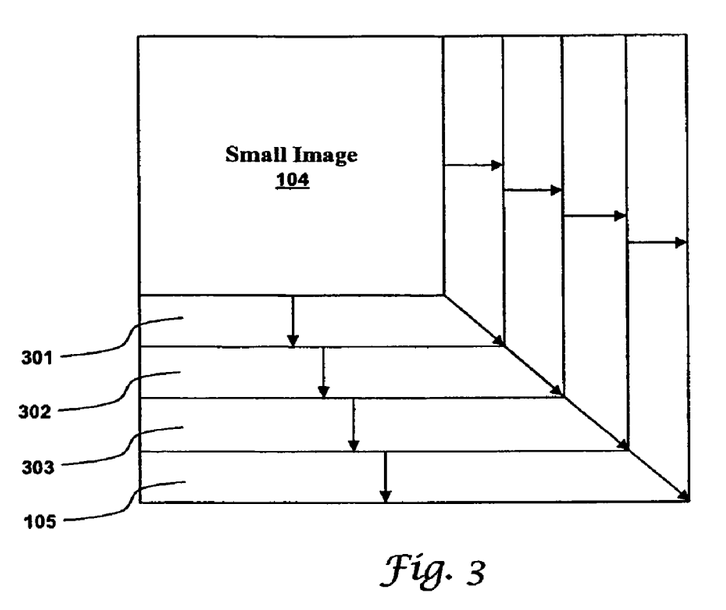
FIG. 3 illustrates scaling a small image in accordance with aspects of certain embodiments.

FIG. 3 illustrates scaling a small image 104 in accordance with aspects of certain embodiments. When an icon is indicated, it can be grown. Growing an icon means increasing the icon size by increasing its height, width, or both. The icon can be presented by displaying the selected image with dimensions equaling the icon size. If the small image 104 is selected, then it is scaled to a larger size. As such, an icon is initially presented by displaying the small image 104. When the icon is indicated it can grow and be presented as the first scaled image 301. If it remains indicated, it can be presented by a series of larger images such as the second scaled image 302 and the third scaled image 303. Eventually, the icon reaches its maximum size. The maximum size equals the dimensions of the associated large image 105. An icon having its maximum size is presented by displaying the associated large image 105. The scaled images can be scaled versions of either the associated large image 105 or the associated small image 104: In FIG. 3, only the associated small image 104 was scaled. In practice, more pleasing results can be obtained by scaling the large image 105. Alternatively, the small image 104 can be selected below a threshold and the large image 105 selected above it. For example, if the third scaled image 303 is larger than the threshold size, then it would be a scaled version of the large image 105.

Figure 4:
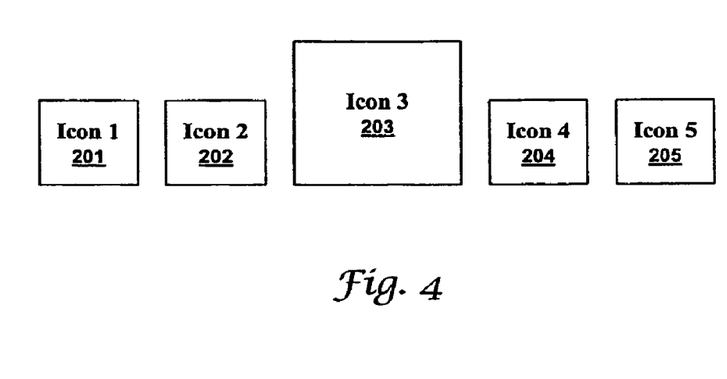
FIG. 4 illustrates a row of icons with the third one large in accordance with aspects of certain embodiments.

FIG. 4 illustrates a row of icons with the third one large in accordance with aspects of certain embodiments. FIG. 4 is similar in most respects to FIG. 2 with the exception that the third icon 203 is indicated. As such, the third icon 203 has grown.

Figure 5:
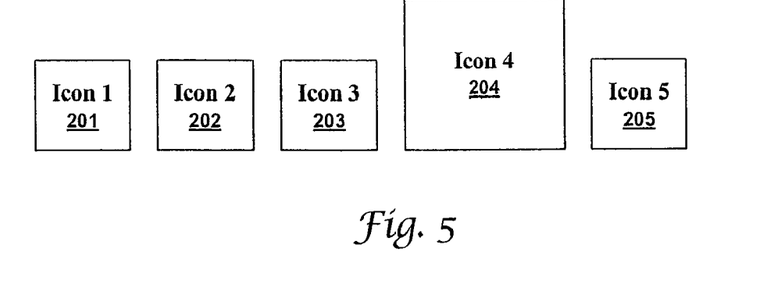
FIG. 5 illustrates a row of icons with the fourth one large in accordance with aspects of certain embodiments.

FIG. 5 illustrates a row of icons with the fourth one large in accordance with aspects of certain embodiments. FIG. 5 is also similar in most respects to FIG. 2 and FIG. 4. Here, however, the fourth icon 204 is indicated. As such, the fourth icon 204 has grown.

Scaling icons, as discussed above, is a special case of morphing. In scaling, large images or small images are morphed into display images by making them larger or smaller. Rotation is also a form of morphing. In FIG. 1, instead of image size 102, image rotation can be used.

Figure 6:
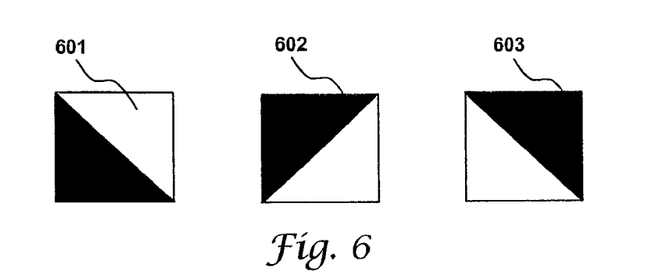
FIG. 6 illustrates morphing an icon by rotation in accordance with aspects of some embodiments.

FIG. 6 illustrates morphing an icon by rotation in accordance with aspects of certain embodiments. Instead of morphing dimensions between a small image and a large image, rotational transforms can be used. An icon can be presented by displaying a first image 601. When the icon is indicated, a rotational transform is applied. After rotating the first image 601 by 90 degrees, a rotated image 602 is displayed. After 180 degrees of rotation, the final image 603 can be displayed. In this example, two 90 degree steps are shown while in practice many smaller steps, perhaps 5 degrees or less, can be used. Those skilled in the arts of digital imaging and image processing know of many algorithms for implementing rotational transformation.

In general, morphing can have a first image, a final image, and a weight. Various parameters or parts of the first image and the final image can be combined to produce a display image. For example, the final image can be a horizontally stretched version of the first image. The width of the display image can be calculated as a weighted sum:

$$w*b+(1-w)*a$$

where a is the width of the first image, b is the width of the second image and w is the weight. Here, the weight has a minimum value of zero and a maximum value of 1. Vertical scaling can be performed using the same equation with a being the height of the first image and b being the height of the second image. The display image can be produced by scaling a small image up or a large image down to the calculated dimensions. Changing the size of images in this manner is known by those skilled in the arts of image processing or image manipulation as geometric morphing.

Figure 7:
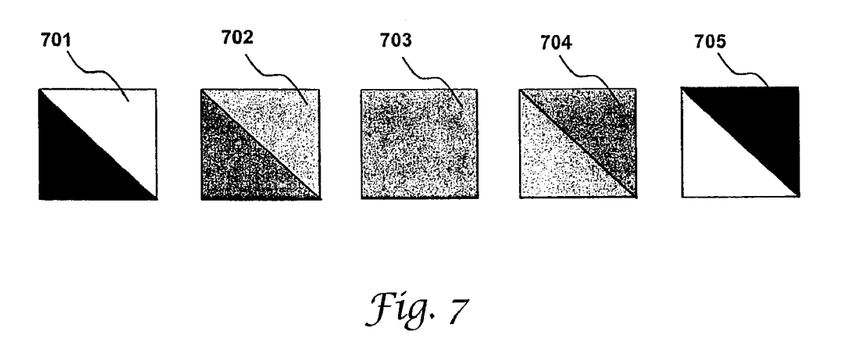
FIG. 7 illustrates morphing an icon by setting pixel values in accordance with aspects of some embodiments.

FIG. 7 illustrates morphing an icon by setting pixel values in accordance with aspects of certain embodiments. A first image 701 has black pixels to the lower left and white pixels to the upper right. A final image 705 has white pixels to the lower left and black pixels to the upper right. The second display image 702 has a weight of 0.25. Applying the weighted sum equation given above to pixel values, the second display image 702 has pixels that are 75% black and 25% white in the lower left corner and has pixels that are 25% black and 75% white in the upper right corner. The third display image 703 having a weight of 0.5 has all pixels 50% black and 50% white. The fourth display image 704 having a weight of 0.75 has pixels that are 25% black and 75% white in the lower left corner and has pixels that are 75% black and 25% white in the upper right corner. This example presented one variation of pixel morphing. Those skilled in the arts of image processing and animation are also familiar with color pixel morphing where pixel values are indexed into a color lookup table and changing pixel values can produce astonishing animation or pseudocolor effects.

Figure 10:
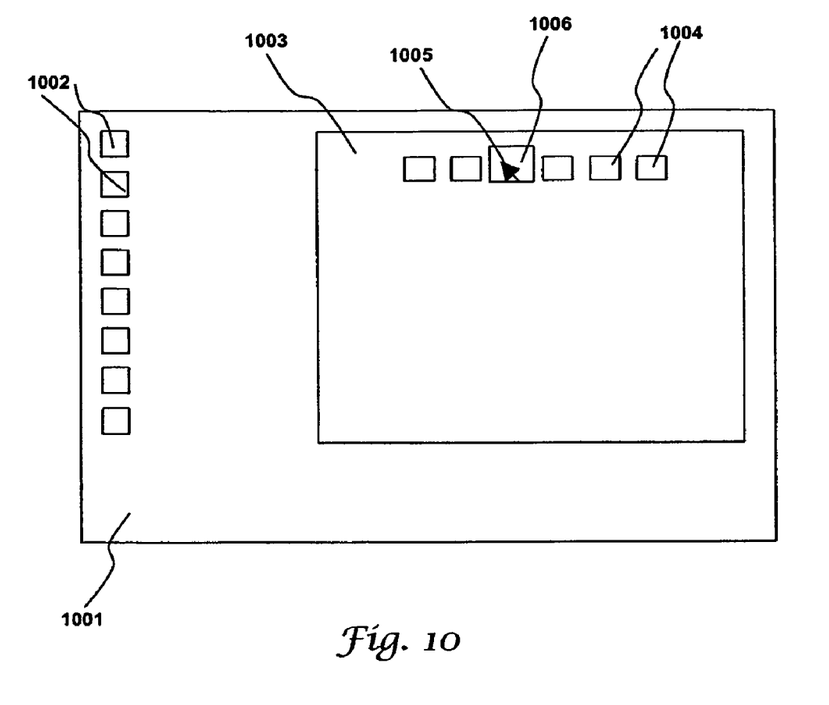
FIG. 10 illustrates a computer desktop in accordance with aspects of the embodiments.

FIG. 10 illustrates a computer desktop 1001 in accordance with aspects of the embodiments. Desktop icons 1002 are shown on the left side of the computer desktop 1001. A web browser window 1003 displays a downloaded web page that includes collateral icons 1004 and an indicated icon 1006. The indicated icon 1006 is indicated because the desktop cursor 1005 is over top of it.

High Level Process Flow

Figure 8:
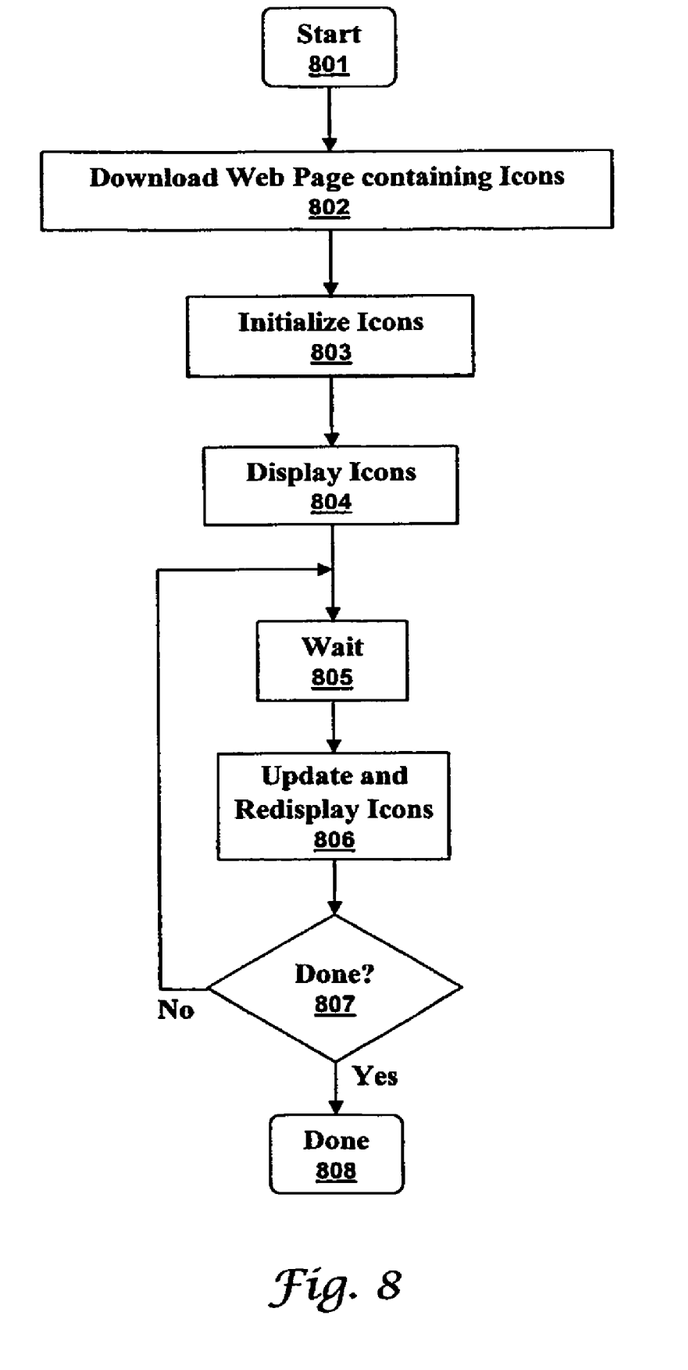
FIG. 8 illustrates a high level flow diagram of loading, displaying, updating, and redisplaying a web page in accordance with aspects of the embodiments.

FIG. 8 illustrates a high level flow diagram of loading, displaying, updating, and redisplaying a web page in accordance with aspects of the embodiments. After the start 801, a web page containing icons is downloaded 802. The icons are initialized 803 and then displayed 804 on the web page. The process then enters an iterative loop. The process waits 805 for a period of time or for a window system event, as discussed above. When it is done waiting, the process updates the icons and redisplays them 806. The process can update and redisplay each icon by submitting each icon to a process flow such as that illustrated in FIG. 9 or FIG. 11. If the process is not done 807, it loops back to waiting 805. Otherwise it is done 808.

Figure 9:
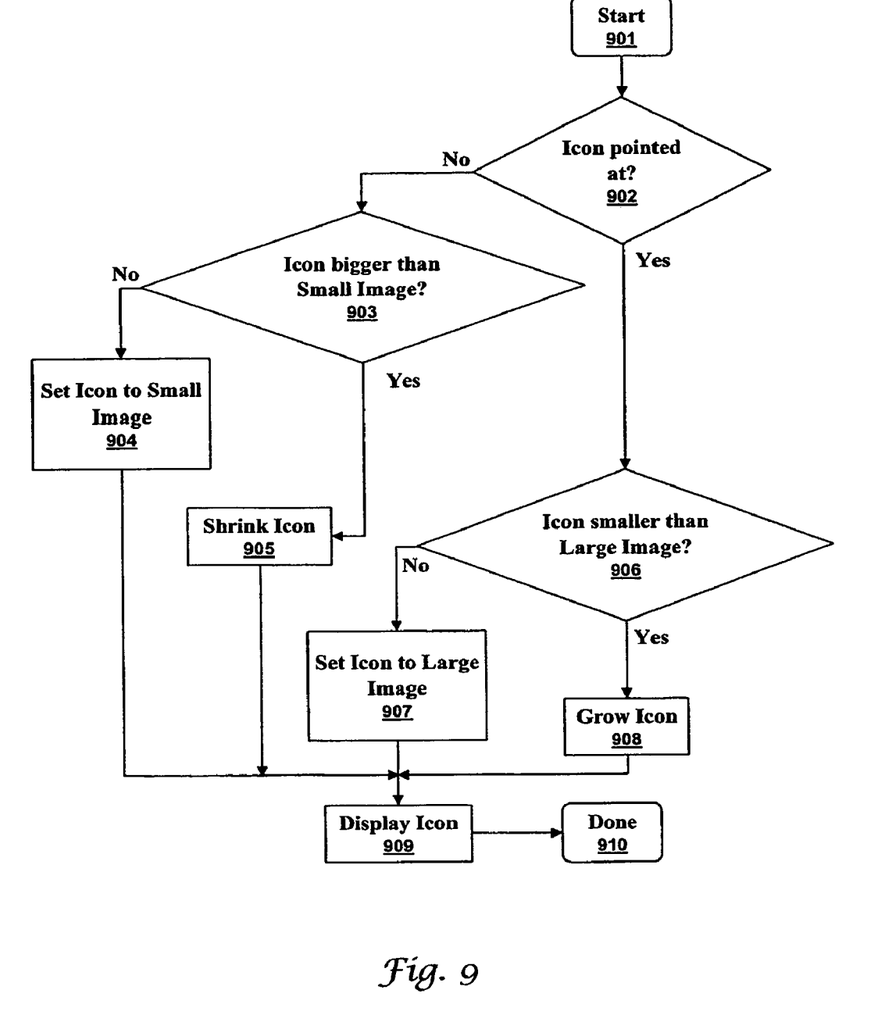
FIG. 9 illustrates a high level flow diagram of growing and shrinking an icon in accordance with aspects of certain embodiments.

FIG. 9 illustrates a high level flow diagram of growing and shrinking an icon in accordance with aspects of some embodiments. After the start 901, if an icon is pointed at 902 it is the indicated icon. Otherwise it is a collateral icon. Most of the time, no icon is indicated. If the icon is collateral and bigger than the small image 903 it is shrunk 905. Otherwise, it is set to the small image 904. If the icon is indicated and smaller than the large image 906, it is grown 908. Otherwise, it is set to the large image 907. Before the process is done 910, the icon is displayed 909.

As discussed above, growing an icon means increasing its icon size while shrinking it means decreasing the icon size. An icon can grow by adding a constant value to its icon size. An icon can shrink by subtracting a constant value from its icon size. Similarly, an icon can grow or shrink by multiplying its icon size by a number greater than or less than one respectively. The icon size has width and height. As such the constant value or the number can have a width value different from the height value so that the different dimensions of the icon exhibit different growth rates.

Figure 11:
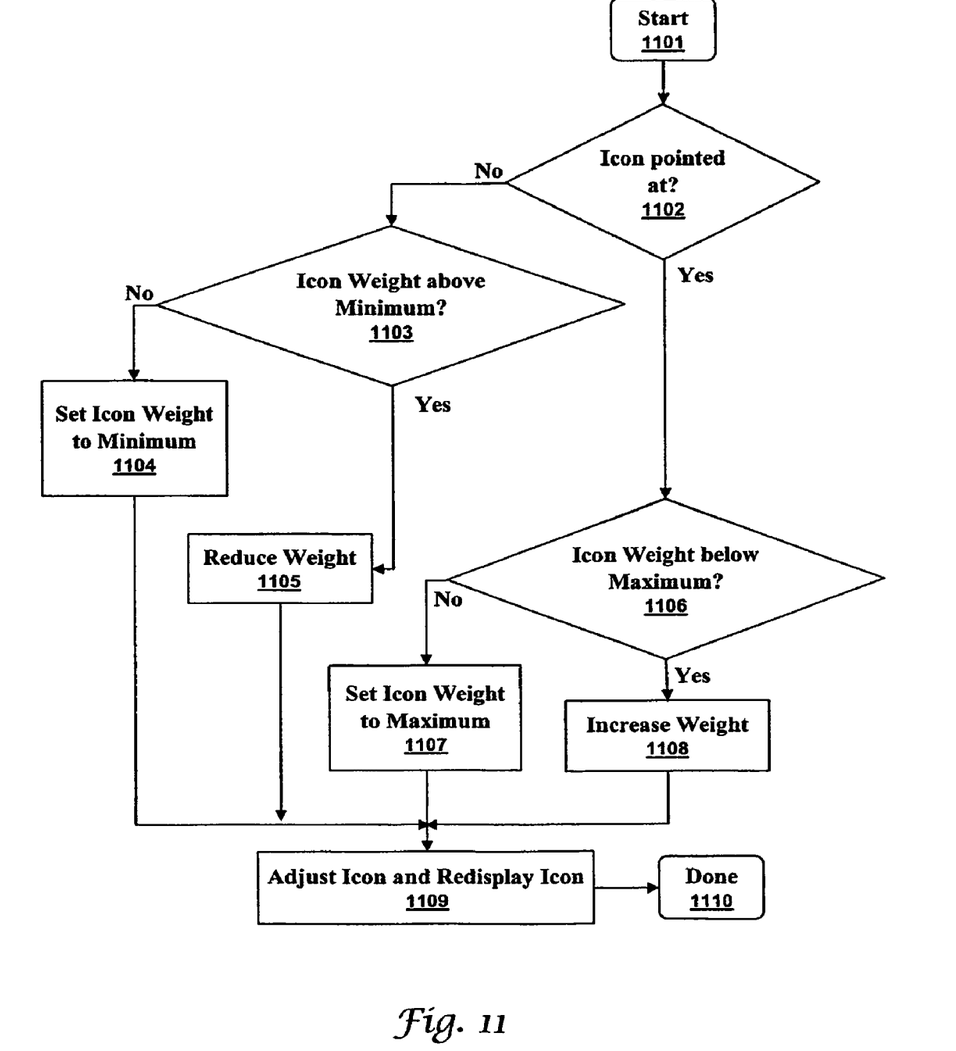
FIG. 11 illustrates a high level flow diagram of morphing an icon in accordance with aspects of some embodiments.

FIG. 11 illustrates a high level flow diagram of morphing an icon in accordance with aspects of the embodiments. The flow diagram of FIG. 11 is similar to that of FIG. 9 with the exception that FIG. 11 deals with an icon morphing based on a weight instead of scaling based on size. After the start 1101, if an icon is pointed at 1102 it is the indicated icon. Otherwise it is a collateral icon. Most of the time, no icon is indicated. If the icon is collateral and has a weight above the minimum 1103, the weight is reduced 1105. Otherwise, it is set to the minimum 1104. If the icon is indicated and weighs less than the maximum 1106 then its weight is increased 1108. Otherwise, its weight is set to the maximum 1107. Before the process is done 1110, the icon is adjusted and redisplayed 1109. Adjusting means that a new display image is produced using the morphing function, weight, first image and final image. Redisplay means that the image shown in the web browser is set to match the new display image.

Normalization is a mathematical operation that adjusts a set of variables so that they add up to a given total. Those skilled in the art of mathematics know of many normalization techniques. For example, ten variables can be normalized to 100. If at first, every variable is set to 5, then the sum is 50. Each variable is then multiplied by 2 because 100/50=2. If one of the variables is increased to 20, then every variable is multiplied by approximately 0.9 because 110/100 is approximately 0.9. Nine of the variables now equal 9 and one of them equals 18 for a sum of 99. The sum is not equal to 100 because of rounding error and results in a normalization error of 100−99=1. The normalization error can be added to one of the variables, distributed among the variables, or ignored.

Normalization produces a pleasing effect when growing or otherwise morphing icons. Normalizing the sizes of the icons causes the total size of the icons to remain constant. For example, an icon bar having ten icons will not grow or shrink as the ten icons grow or shrink if the icon sizes are normalized. As such, the icon bar does not seem to have a jerky behavior.

General

Embodiments can be implemented in the context of modules. In the computer programming arts, a module (e.g., a software module) can be implemented as a collection of routines and data structures that perform particular tasks or implement a particular abstract data type. Modules generally can be composed of two parts. First, a software module may list the constants, data types, variables, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term "module", as utilized herein generally refers to software modules or implementations thereof. Such modules can be utilized separately or together to form a program product that can be implemented through signal-bearing media, including transmission media and recordable media.

The examples discussed above are intended to illustrate aspects of the embodiments. The phrases "an embodiment", "some embodiments", or "certain embodiments" do not necessarily refer to the same embodiment or any specific embodiment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method comprising:
   displaying a display image for each of at least two icons wherein each of the at least two icons is associated with a respective icon size, small image, large image, weight that is a parameter used to produce the display image, and morphing function that produces the display image from the small image and the large image;
   upon indication of one of the at least two icons, for every indicated icon of the at least two icons having a weight less than a maximum value, increasing the indicated icon's weight and morphing the indicated icon's display image using the indicated icon's morphing function to grow the indicated icon's display image up to the size of the indicated icon's associated large image; and
   for every collateral icon of the at least two icons having a weight exceeding a minimum value, reducing the respective collateral icon's weight and morphing the collateral icon's display image using the morphing function to shrink the respective collateral icon's display image down to the size of the at least one collateral icon's associated small image.

2. The computer-implemented method of claim 1 wherein the morphing the indicated icon's display image comprises:
   increasing the icon size of the indicated icon's display image by a constant amount in height and by a constant amount in length.

3. The computer-implemented method of claim 1 wherein the morphing the collateral icon's display image comprises:
   decreasing the icon size of the collateral icon's display image by a constant amount in height and by a constant amount in length.

4. The computer-implemented method of claim 1 further comprising:
   normalizing the icon size of the at least two icons.

5. The computer-implemented method of claim 1 wherein the displaying occurs in a display view presented by a web browser.

6. The computer-implemented method of claim 1 wherein the morphing is independent of an opening event associated with the indicated icon, wherein the opening event initiates a software module associated with the indicated icon.

7. A computer-implemented method comprising:
   displaying a display image of each of at least two icons wherein each of the at least two icons is associated with a respective first image, final image and morphing function that produces the display image from the first image, the final image and a weight that is a parameter used to produce the display image;
   for every indicated icon of the at least two icons having a weight less than the maximum value, increasing the indicated icon's weight and morphing the indicated icon's display image using the indicated icon's morphing function; and
   for every collateral icon of the at least two icons having a weight exceeding the minimum value, reducing the respective collateral icon's weight and morphing the respective collateral icon's display image using the respective collateral icon's morphing function.

8. The computer-implemented method of claim 7, wherein the reducing does not reduce the respective collateral icon's weight below the minimum value and the increasing does not increase the indicated icon's weight above the maximum value.

9. The computer-implemented method of claim 7 wherein morphing further includes calculating pixels of the display image as a weighted sum of first image pixel values and final image pixel values.

10. The computer-implemented method of claim 7 wherein morphing further includes calculating height and width of the display image as a weighted sum of height and width of the first image and height and width of the final image.

11. The computer-implemented method of claim 10 wherein morphing further includes producing a scaled first image and a scaled final image having the height and width of the display image and wherein morphing further includes calculating pixel values of the display image as a weighted sum of scaled first image pixel values and scaled final image pixel values.

12. The computer-implemented method of claim 7 wherein increasing the weight comprises iteratively adding a constant value to the weight.

13. The computer-implemented method of claim 7 wherein decreasing the weight comprises iteratively subtracting a constant value to the weight.

14. The computer-implemented method of claim 7 further comprising:
   normalizing the weights of the at least two icons.

15. The computer-implemented method of claim 7 wherein the displaying occurs in a display view presented by a web browser.

16. The computer-implemented method of claim 7 wherein the morphing is independent of an opening event associated with each indicated icon, wherein the opening event initiates a software module associated with the respective indicated icon.

17. A system for displaying icons on a display comprising:
   a display module, implemented on a non-transitory recordable media, configured to display a display image for each of at least two icons on the display wherein each of the at least two icons is associated with a respective icon size, small image, large image, weight that is a parameter used to produce the display image, and morphing function that produces the display image from the small image and large image; and
   a morphing module, implemented on a non-transitory recordable media, configured to:
   upon indication of one of the at least two icons, for every indicated icon of the at least two icons having a weight less than a maximum value, increase the indicated icon's weight and morph the indicated icon's display image up to the size of the indicated icon's associated large image using the indicated icon's morphing function;

for every collateral icon of the at least two icons having a weight exceeding a minimum value, reduce the respective collateral icon's weight and morph the collateral icon's display image down to the size of the respective collateral icon's associated small image using the respective collateral icon's morphing function; and update the display images for icons on the display.

18. The system of claim 17 wherein the display module implemented on a non-transitory recordable media manager is further configured to display the display image for each of the at least two icons in a display presented by a web browser.

19. A system for displaying icons on a display comprising:
a display module, implemented on a non-transitory recordable media, configured to display a display image of each of at least two icons on a display device wherein each of the at least two icons is associated with a respective first image, final image and morphing function that produces the display image from the first image, the final image and a weight that is a parameter used to produce the display image; and a morphing module, implemented on a non-transitory recordable media, configured to:
for every indicated icon of the at least two icons having a weight less than the maximum value, increase the respective indicated icon's weight and morph the respective indicated icon's display image using the respective indicated icon's morphing function;

for every collateral icon of the at least two icons having a weight exceeding the minimum value, reduce the respective collateral icon's weight and morph the respective collateral icon's display image using the respective collateral icon's morphing function; and update the display images for icons on the display.

20. The system of claim 19 wherein the display module implemented on a non-transitory recordable media manager is further configured to display the display image for each of the at least two icons in a display presented by a web browser.

21. The system of claim 1 wherein indication of one of the at least two icons includes hovering a cursor over one of the at least two icons.

* * * * *